United States Patent [19]
Qureshi et al.

[11] Patent Number: 5,864,003
[45] Date of Patent: Jan. 26, 1999

[54] THERMOSETTING PHENOLIC RESIN COMPOSITION

[75] Inventors: Shahid P. Qureshi, Duluth; Charles Chan, Stone Mountain, both of Ga.

[73] Assignee: Georgia-Pacific Resins, Inc., Atlanta, Ga.

[21] Appl. No.: 681,681

[22] Filed: Jul. 23, 1996

[51] Int. Cl.$^6$ .............................. C08G 8/10; C08G 12/00
[52] U.S. Cl. ............................................................ 528/141
[58] Field of Search ............................................. 528/141

[56] References Cited

U.S. PATENT DOCUMENTS

| | | |
|---|---|---|
| Re. 32,812 | 12/1988 | Lemon et al. . |
| 2,599,807 | 6/1952 | Bersworth . |
| 2,609,390 | 9/1952 | Bersworth . |
| 2,841,611 | 7/1958 | Berswoth et al. . |
| 2,993,067 | 7/1961 | Magerlein et al. . |
| 3,121,697 | 2/1964 | Gizard et al. . |
| 3,234,140 | 2/1966 | Irani et al. . |
| 3,298,956 | 1/1967 | Irani et al. . |
| 3,341,340 | 9/1967 | Sawyer et al. . |
| 3,395,113 | 7/1968 | Irani et al. . |
| 3,422,046 | 1/1969 | Thomas et al. . |
| 3,423,369 | 1/1969 | Nachbur et al. . |
| 3,440,201 | 4/1969 | Sempert et al. . |
| 3,470,112 | 9/1969 | Irani et al. . |
| 3,483,178 | 12/1969 | Crutchfield et al. . |
| 3,562,197 | 2/1971 | Sears et al. . |
| 3,932,303 | 1/1976 | Hollinghad . |
| 3,983,098 | 9/1976 | Bussi et al. . |
| 4,061,695 | 12/1977 | Tai et al. . |
| 4,100,231 | 7/1978 | Tai et al. . |
| 4,111,880 | 9/1978 | Abendroth et al. ..................... 156/327 |
| 4,246,157 | 1/1981 | Laitar . |
| 4,256,844 | 3/1981 | Martin et al. . |
| 4,331,583 | 5/1982 | Everett . |
| 4,338,209 | 7/1982 | Manabe et al. . |
| 4,404,313 | 9/1983 | Leitner . |
| 4,505,748 | 3/1985 | Baxter . |
| 4,661,280 | 4/1987 | Ouhadi et al. . |
| 4,662,173 | 5/1987 | Broze et al. . |
| 4,671,934 | 6/1987 | Terry et al. . |
| 4,751,320 | 6/1988 | Masuda et al. . |
| 4,785,040 | 11/1988 | Gupta et al. . |
| 4,786,431 | 11/1988 | Broze et al. . |
| 4,918,122 | 4/1990 | Dallas et al. .............................. 524/95 |
| 4,927,550 | 5/1990 | Cutcher et al. . |
| 4,983,654 | 1/1991 | Cheung et al. . |
| 4,994,581 | 2/1991 | Takeda et al. . |
| 5,002,126 | 3/1991 | Carlberg et al. . |
| 5,008,036 | 4/1991 | Crompton et al. . |
| 5,057,238 | 10/1991 | Broze et al. . |
| 5,096,983 | 3/1992 | Gerber ..................................... 528/129 |
| 5,152,177 | 10/1992 | Buck et al. . |
| 5,196,070 | 3/1993 | Ables et al. . |
| 5,243,015 | 9/1993 | Hutchings et al. . |
| 5,344,909 | 9/1994 | Hutchings et al. . |
| 5,378,793 | 1/1995 | Oprin . |

FOREIGN PATENT DOCUMENTS

| | | |
|---|---|---|
| 0 539 098 A1 | 4/1993 | European Pat. Off. . |
| 812390 | 4/1959 | United Kingdom . |
| 1604657 | 12/1981 | United Kingdom . |

*Primary Examiner*—Jeffrey C. Mullis
*Attorney, Agent, or Firm*—Banner & Witcoff, Ltd.

[57] ABSTRACT

This invention relates to a resin composition capable of being thermally cured having both a long pot life at low temperatures and a fast curing rate at higher temperatures containing a mixture of (a) a phenol-formaldehyde resole resin, and (b) a latent curing agent selected from a particular class of nitrogen-containing acidic phosphorus compounds made from either phosphoric acid or phosphorous acid.

21 Claims, No Drawings

THERMOSETTING PHENOLIC RESIN COMPOSITION

BACKGROUND OF THE INVENTION

1. Field of the Invention

This invention relates to a phenolic resin composition capable of being thermally cured and having both a long pot life and a fast curing rate. The present invention particularly relates to a phenolic resole resin composition and especially a phenol-formaldehyde resole resin composition containing a mixture of (a) a phenol-formaldehyde resole resin, and (b) a latent curing agent selected from a particular class of nitrogen-containing phosphorous compounds made from either phosphoric acid or phosphorous acid. The present invention is further directed to a method of making the phenolic resole resin composition, to a method of curing the phenolic resin composition and also to a method of making molded articles and composites using the phenolic resole resin composition.

2. Description of Related Art

Phenolic resole resins have long been cured with strong acids, such as sulfuric acid and organo-sulfonic acids. When used alone, these acids cause rapid hardening of most resole resins even at an ambient temperature, complicating the use of such resins for many applications particularly in making fiber reinforced plastic (FRP) and other resin composites and molded resin articles. The prior art, therefore, has long sought ways to retard the rate of resin cure at temperatures below the desired curing condition as a way of prolonging the pot life of such resin systems. To be useful, however, such cure rate retardation must be accomplished without degrading, to an unacceptable extent, the ultimate cure rate of the resin at the elevated cure temperature.

U.S. Pat. No. 5,243,015 represents one approach to solving this problem which uses a latent catalyst comprising a salt of a primary or secondary amine and a strong acid. This latent catalyst improves storage stability (pot life) of the resole resin composition, while providing a cure rate at an elevated temperature comparable to the rate obtained using conventional strong acid catalysts. Strong acids also may be added to the composition, to an extent to act synergistically with the latent catalyst to accelerate the rate of reaction; but preferably not in an amount which would cure the resin at a commercially useful rate by itself.

U.S. Pat. No. 5,378,793 (European Patent Application 539,098) represents another approach. This patent discloses using a partial phosphate ester as a hardener for phenolic resole resins. The partial phosphate ester is prepared by reacting (partially esterifying) condensed phosphoric acids, such as orthophosphoric acid, pyrophosphoric acid, tetraphosphoric acid or phosphorus pentoxide under relatively stringent conditions of temperature and vacuum, with polyols, such as glycerol, pentaertrythritol, sucrose and others to a constant free acidity value.

It is reported that the partial phosphate ester hardener exhibits a delayed action, i.e., the hardener cures the resole relatively slowly at a lower temperature, but allows a rapid cure when the temperature is increased. This presumably is due to dissociation of the ester at an elevated temperature to release free acid which acts as the hardener and promotes the cure reaction. Thus, it is the inherent acidity of the phosphate ester that causes the resole resin to cure. At lower temperatures, however, the partial ester is stable (i.e., has a relatively low acid value) and does not contribute to a premature cure of the resole.

There remains a need for a phenolic resin composition having a cure behavior that provides a long pot life at temperatures below curing conditions, but exhibits a rapid hardening at elevated cure temperatures.

BRIEF DESCRIPTION OF THE INVENTION

The present invention is directed to a phenolic resole resin composition capable of being thermally cured having both a long pot life at temperatures below curing conditions and a fast curing (hardening) rate at a higher curing temperature.

The present invention is based upon the discovery that certain nitrogen-containing phosphorus compounds made from either phosphoric acid or phosphorous acid, hereinafter alternatively referred to as the nitrogen-containing acidic phosphorus latent curing agent, the acidic phosphorus curing agent or the latent curing agent, desireably alter the hardening behavior of phenolic resole resin compositions.

In particular, the invention is directed to the use of certain nitrogen-containing acidic phosphorus latent curing agents, which are compounds containing one or more moieties of the following formula:

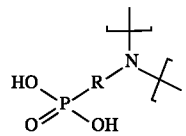

where R is selected from a $C_1$ to $C_6$ alkylene radical, a $C_3$ to $C_7$ cycloalkylene radical, an arylene radical and a divalent radical of the formula:

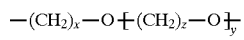

where x and z are integers of 1 to 6, and y is an integer from 0 to 2 and wherein the divalent radical is bonded to the phosphorous atom of said moieties through the terminal oxygen atom of said radical.

One preferred class of such nitrogen-containing acidic phosphorus latent curing agents includes compounds of the following formula:

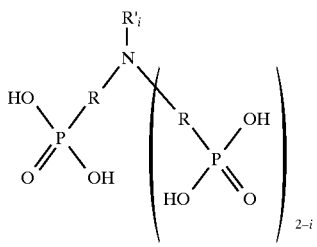

where R is selected from a $C_1$ to $C_6$ alkylene radical, a $C_3$ to $C_7$ cycloalkylene radical, an arylene radical and a divalent radical of the formula:

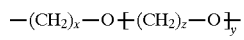

where x and z are integers of 1 to 6, and y is an integer from 0 to 2 and wherein the divalent radical is bonded to the phosphorus atoms of said compound through the terminal oxygen atom of said radical and where i is either 0 or 1, and R' is selected from hydrogen, a $C_1$ to $C_6$ alkyl, $C_1$ to $C_6$ alkoxy, a cycloalkyl, and an aryl.

Another class of nitrogen-containing, acidic phosphorus curing latent agents includes compounds of the formula:

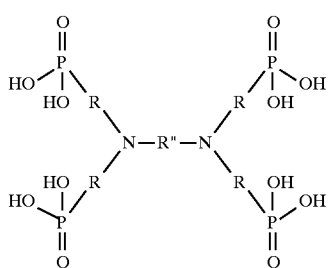

where R" is a divalent organic radical, such as an alkylene group having from 1 to 12 carbon atoms and R has the same meaning noted above.

Yet another class of nitrogen-containing, acidic phosphorus latent curing agents has the formula:

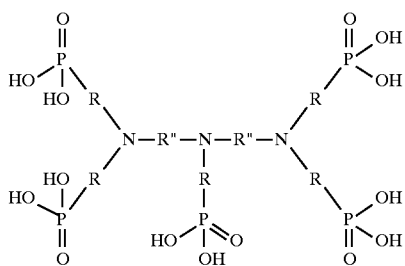

where R and R" have the same meanings as above.

In preferred practice, the present invention is directed to the use of a combination of such a nitrogen-containing, acidic phosphorus latent curing agent with a strong acid catalyst for use as the hardening agent of a phenolic resole resin composition. The latent curing agent and the strong acid catalyst are present in the phenolic resole resin composition in a sufficient amount, and in a suitable weight ratio, which does not prematurely cure the phenolic resole resin at a temperature below a desired elevated hardening temperature for the resin, but which causes a rapid hardening of the resin at the desired cure (hardening) temperature. With the combination of the latent curing agent and the strong acid catalyst, such phenolic resole resin compositions exhibit both a long pot life at below the curing temperature and a rapid cure at the elevated hardening temperature. Best results are obtained by combining the latent curing agent and the strong acid catalyst with a phenolic resole resin having a high proportion of highly methylolated dimers.

The present invention also is directed to a method of making a phenolic resole resin composition comprising reacting phenol with formaldehyde under alkaline conditions to form a phenolic resole resin, neutralizing the resin, adding a latent curing agent, and subsequently adding a strong acid catalyst, wherein the latent curing agent is added in a sufficient amount to retard the curing of the resin at a first lower temperature in the presence of the strong acid catalyst, but to permit a rapid cure at a second higher temperature.

The present invention is further directed to a method of making a resin composite comprising impregnating a substrate with the resin composition and then curing (hardening) the composition at an elevated temperature. Preferably the substrate is impregnated at an ambient temperature to slightly above ambient temperature.

Additional advantages of the invention will be set forth in part in the description which follows, and in part will be apparent from the description, or may be learned by the practice of the invention. The advantages of the invention may be realized and obtained by means of the elements and combinations particularly pointed out in the claims.

It is to be understood that both the foregoing general description and the following detailed description are exemplary and explanatory only and are not restrictive of the present invention as claimed.

DETAILED DESCRIPTION OF THE INVENTION

The present invention is directed to a predominatly aqueous phenolic resole resin composition capable of being thermally cured, i.e., a thermosetting resin composition, comprising a mixture of (a) a phenolic resole resin, and (b) a nitrogen-containing acidic phosphorus latent curing agent containing one or more moieties of the following formula:

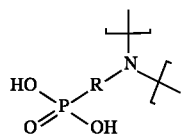

where R is selected from a $C_1$ to $C_6$ alkylene radical, a $C_3$ to $C_7$ cycloalkylene radical, an arylene radical and a divalent radical of the formula:

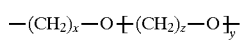

where x and z are integers of 1 to 6, and y is an integer from 0 to 2 and wherein the divalent radical is bonded to the phosphorous atom of said moieties through the terminal oxygen atom of said radical.

One preferred class of such nitrogen-containing acidic phosphorus latent curing agents includes compounds of the following formula:

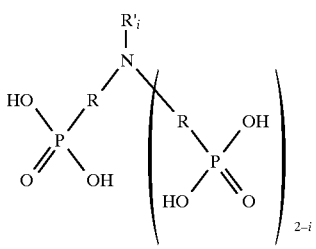

where R is selected from a $C_1$ to $C_6$ alkylene radical, a $C_3$ to $C_7$ cycloalkylene radical, an arylene radical and a divalent radical of the formula:

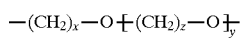

where x and z are integers of 1 to 6, and y is an integer from 0 to 2 and wherein the divalent radical is bonded to the phosphorus atoms of said compound through the terminal oxygen atom of said radical and where i is either 0 or 1, and R' is selected from hydrogen, a $C_1$ to $C_6$ alkyl, $C_1$ to $C_6$ alkoxy, a cycloalkyl, and an aryl.

Another class of nitrogen-containing, acidic phosphorus latent curing agents includes compounds of the formula:

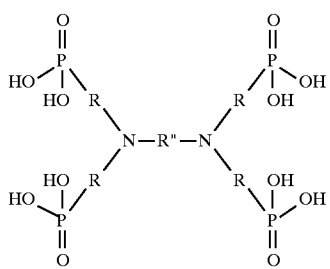

where R" is a divalent organic radical, such as an alkylene group having from 1 to 12 carbon atoms and R has the same meaning noted above.

Yet another class of nitrogen-containing, acidic phosphorus latent curing agents have the formula:

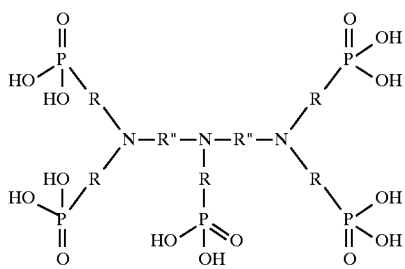

where R and R" have the same meanings as above.

In a preferred arragement, the present invention in directed to a phenolic resole resin composition capable of being thermally cured comprising a mixture of (a) a phenolic resole resin, (b) a latent curing agent as above described, and (c) a strong acid curing catalyst, wherein the latent curing agent is present in a sufficient amount relative to the strong acid to retard the curing (hardening) of the resin at a first lower temperature in the presence of the strong acid catalyst, but to permit a rapid cure at a second higher temperature.

The phenolic resole resin may be prepared in a known manner from well known starting materials. Such resins are prepared by reacting, under alkaline conditions, an aldehyde component and a phenol component such that reactive methylol groups are formed in the resin product. For example, suitable phenolic resole resins may be produced by reacting formaldehyde and a phenol component in an aqueous reaction medium under the alkaline reaction condition. An alkaline reaction condition can be established by use of any of the wide variety of basic catalysts, organic and inorganic, known to those skilled in the art. On the basis of cost and performance, an alkali metal hydroxide, and usually sodium hydroxide, is often the catalyst of choice. However, in many instances amine catalysts are also preferred.

The phenolic resole resin preferably is prepared so that it contains a large proportion of highly reactive, highly methylolated phenolic dimer species, including tetra-, tri- and dimethylolated phenolic dimer species. More preferably, the resin contains a large proportion of the tetramethylolated phenolic species or tetradimers, e.g., 4 to 8 wt % of the resin. The methylol groups are capable of reacting with one another at elevated temperatures with or without the addition of auxiliary catalysts. Such resins can cure under the influence of both basic and acidic catalysts. The present invention is directed to curing (hardening) the resin in the presence of an acid catalyst.

Suitable phenolic resole resins for use in the present invention are prepared using a mole ratio of formaldehyde to phenol preferably of at least about 0.9:1, and more preferably at least about 1:1, up to a mole ratio of about 3.5:1 and more preferably up to about 1.85:1. Particularly useful phenolic resole resins in the present invention exhibit a long pot life and a lower tendency to show strong exotherms of the type which initiate at 55° C.

The phenol component used to prepare the phenolic resole resin includes any phenol typically used in preparing phenolic resole resins, which are not substituted at either the two ortho positions or at one ortho and the para position, such unsubstituted positions being necessary for the desired polymerization (dimerization, trimerization, etc.) reactions to occur. Phenols substituted in these positions may be used in lesser quantities (e.g., up to about 30 weight %, and generally not more than about 10 weight %, of the phenol component) as it is known in the art to control molecular weight by a chain termination reaction. Any one, all, or none of the remaining carbon atoms of the phenol ring can be substituted in a conventional fashion. The nature of these substituents can vary widely, and it is only necessary that the substituent not interfere in the polymerization of the aldehyde with the phenol at the ortho and/or para positions thereof. Furthermore, at least a portion of the phenol component must include a phenol not blocked at either of the ortho and the para positions (i.e., a trifunctional phenol) so that the resin is thermosettable. Preferably, at least 10% by weight of the phenol component should include such trifunctional phenols, more preferably at least 25% by weight, most preferably at least 75% by weight and usually the phenol component consists essentially entirely of such trifunctional phenol.

Substituted phenols employed in the formation of the phenolic resins include, for example, alkyl substituted phenols, aryl substituted phenols, aralkyl substituted phenols, cycloalkyl substituted phenols, alkenyl-substituted phenols, alkoxy substituted phenols, aryloxy substituted phenols, and halogen-substituted phenols, the foregoing substituents possibly containing from 1 to 26, and preferably from 1 to 9, carbon atoms.

Specific examples of suitable phenols for preparing the resole resin composition of the present invention include: hydroxybenzene (phenol), o-cresol, m-cresol, p-cresol, 3,5-xylenol, 3,4-xylenol, 3,4,5-trimethylphenol, 3-ethyl phenol, 3,5-diethyl phenol, p-butyl phenol, 3,5-dibutyl phenol, p-amyl phenol, p-cyclohexyl phenol, p-octyl phenol, 3,5-dicyclohexyl phenol, p-phenyl phenol, p-crotyl phenol, phenylethyl, 3,5-dimethoxy phenol, 3,4,5-trimethoxy phenol, p-ethoxy phenol,p-butoxy phenol, 3-methyl-4-methoxy phenol, p-phenoxy phenol and mixtures thereof. Ordinary phenol normally is preferred for most applications.

The phenol component may also include a small amount of di-functional phenol such as resorcinol, catechol, or hydroquinone or p,p'-dihydroxy bi-phenyl.

Formaldehyde can be used alone or in combination with any of the aldehydes or their equivalents heretofore employed in the formation of phenolic resole resins including, for example, acetaldehyde, propionaldehyde, butylaldehyde furfuraldehyde, and benzaldehyde. In general, the aldehydes employed have the formula R'CHO wherein R' is a hydrogen or hydrocarbon radical generally of 1–8 carbon atoms. It will be appreciated that some aldehydes, e.g., acetaldehyde and butylaldehyde, improve toughness of the resole resin at the expense of lowering the HDT thereof (heat distortion temperatures, as determined by American Society for Testing and Materials ASTM D-648). Also, it is contemplated that difunctional aldehydes can be used to prepare the phenolic resin, and could advantageously be used to introduce cross-links into the cured resin. Ordinary formaldehyde is preferred for most applications. Formaldehyde can be supplied in any one of its commonly available forms including formalin solutions and paraformaldehyde.

It also is contemplated that the phenolic resole resin can be prepared in the presence of other resin modifier monomers such as urea, furan and melamine. It is intended that such modified phenolic resins be included in the thermosetting phenolic resole resin compositions of the present invention.

The resole resin composition of the present invention preferably has a solids level of about 60 to 95%, more preferably about 70 to 90%, although higher or lower solids may be used depending on specific applications. The viscosity of the composition is usually from about 200 cp to 5000 cp, and preferably about 300 to 1500 cp, measured at 25° C. As with solids content, both higher and lower viscosities may be used depending on specific applications. The composition preferably has a free phenol content below 15% by weight and a free aldehyde content below 3% by weight, more preferably below 1.0% by weight, based on the weight of the resin composition.

In order to achieve the desired free aldehyde content, it is contemplated that the phenolic resole resin can be treated with an aldehyde scavenger to lower the amount of free aldehyde in the resin. The scavenger is added in amounts sufficient to reduce the level of free aldehyde without significantly affecting the cure rate or desirable strength of the cured resin. It is preferred to use between 0.5 and 1.5 mole equivalents of scavenger per mole of free aldehyde present at the end of the resole preparation. Typical aldehyde (formaldehyde) scavengers include urea, melamine, toluene sulfonamide and dicyandiamide. Preferable scavengers are urea and toluene sulfonamide.

A variety of other modifiers also can be added into the resole resin in order to improve toughness and other cured resin properties. These modifiers include, for example, chain terminating phenols, glycols, with or without halogen substitution for additional fire retardancy, polyester polyols, polyether polyols, alkyl phenols, hydroxy-containing acrylates, and the like and mixtures thereof. The proportion of such modifiers incorporated into the resole resin composition typically ranges from 5 to 35 weight percent (based on the phenol component.)

Other modifiers such as fire retardants and fillers can be added to complete the phenolic resole resin composition. Reactive modifiers can be added to the resole resin after it has been formulated such as di- and higher polyols, e.g., di- or polyhydric phenols, resorcinol, phloroglucinol, and the like. Finally, modifiers to achieve special effects in particular applications may be appropriate, e.g., polyvinyl butyrals, or epoxies for better impact strength in composites.

Another component which may be used in phenolic resole resin compositions of the present invention is an organic solvent. While the resin composition is predominately aqueous, a variety of organic solvents can be used in diluting the phenolic resole resin composition to a desired solids concentration or viscosity for certain applications. Suitable organic solvents include aromatic solvents including benzene, toluene, xylene, ethyl benzene, and the like, polar solvents such as furfural, furfuryl alcohol (which co-reacts under acid conditions) various Cellosolves, carbitols, ketones, and various alcohols such as ethylene glycol, benzyl alcohol and the like. Generally, such organic solvents may consititue up to 50 weight percent of the total solvent, and preferably not more than 25 weight %. For environmental reasons, water is the preferred as the sole solvent.

The other essential component of the phenolic resole resin composition of the invention is a nitrogen-containing acidic phosphorus latent curing agent which is a compound containing one or more moieties of the following formula:

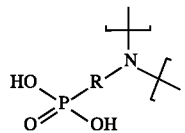

where R is selected from a $C_1$ to $C_6$ alkylene radical, a $C_3$ to $C_7$ cycloalkylene radical, an arylene radical and a divalent radical of the formula:

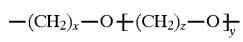

where x and z are integers of 1 to 6, and y is an integer from 0 to 2 and wherein the divalent radical is bonded to the phosphorous atom of said moieties through the terminal oxygen atom of said radical. The latent curing agent generally is provided in the composition in an amount between about 0.5 to 20 parts per hundred parts of the phenolic resole resin solids (pphr), and more preferably between about 1 to 10 pphr. Most often, the latent acidic phosphorus curing agent will be employed in an amount of between about 1 and 7 parts per hundred parts of the phenolic resole resin solids (pphr).

One preferred class of such latent curing agents can be prepared by reacting (partially neutralizing) orthophosphoric acid ($H_3PO_4$) with a di- or tri-alkanol amine. Suitable alkanol amines may have the formula:

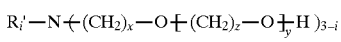

where i is either 0 or 1, R' is selected from hydrogen, a $C_1$ to $C_6$ alkyl, $C_1$ to $C_6$ alkoxy, a cycloalkyl, and an aryl, x and z are integers of 1 to 6, y is an integer from 0 to 2.

Phosphoric acid equivalents such as pyrophosphoric acid (which is equivalent to 105% orthophophoric acid), tetraphosphoric acid (which is equivalent to 115% orthophosphoric acid) or phosphorus pentoxide (which is equivalent to 138% orthophosphoric acid) also may be used as the phosphoric acid source.

Such alkanol amines are commercially available and include dimethanol-amine, diethanolamine, dipropanolamine, dibutanolamine, trimethanolamine, triethanolaamine, tripropanolamine, tributanolamine and the alkylene oxide adducts of these alkanolamines such as the ethylene oxide and propylene oxide adducts.

Acidic phosphorus curing agents prepared in this manner from trialkanolamines and such adducts have the following formula:

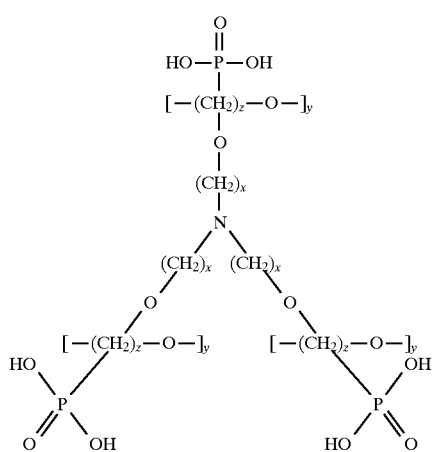

where the oxygen of the alkylenoxy is bonded to the phosphorous and where x, y and z have the same meanings defined above.

A particularly preferred latent curing agent is the one prepared by neutralizing ortho-phosphoric acid with trimethanolamine, triethanolamine, tripropanolamine and the like. These preferred curing agents have the formula:

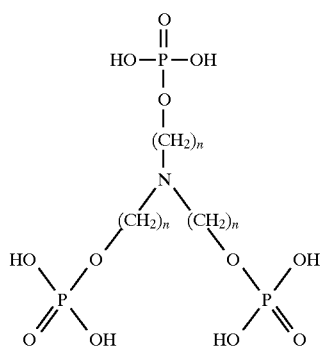

where n is an integer of 1 to 4.

The neutralization adduct of triethanolamine (TEA) and phosphoric acid in an amount of three moles of acid per mole of TEA is known in the art and is commercially available as aminotriethanol phosphate or ATP. For example, AT is available commercially from P. Chem, Inc., Latexo, Tex. The reaction product is basically considered a triester of TEA and has an acid number of 510–525. ATP has the following formula:

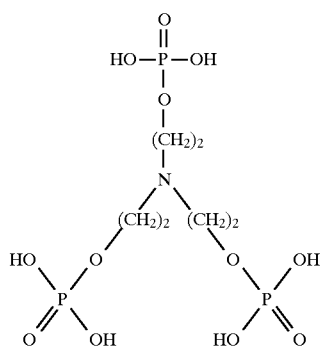

A second class of acidic phosphorus latent curing agents, generally referred to as phosphonates, can be prepared by reacting phosphorous acid, formaldehyde and ammonia or a primary amine through a phosphonomethylation reaction among the ammonia or amine, formaldehyde and phosphorous acid. Hydrochloric acid may be added to the reaction mixture to suppress the oxidation of phosphite to phosphate.

A diphosphonic acid of the formula (VI):

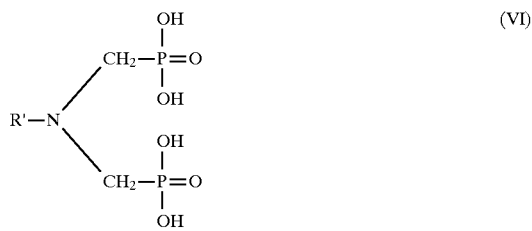

where R' is a monovalent organic radical, preferably a substituted or unsubstituted alkyl group having 1 to 6 carbon atoms such as propyl, isopropyl, butyl, hexyl or 2-hydroxyethyl, can be prepared from a primary amine. An example of a tri-phosphonic acid is aminotris(methylene-phosphonic acid) (ATMP) made by reacting ammonia, formaldehyde and phosphorous acid. ATMP has the formula:

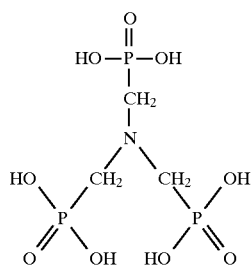

ATMP also is commercially available from P. Chem, Inc. Examples of tetra-phosphonic acids $R(PO_3H_2)_4$ are the alkylene diamine tetra(methylene-phosphonic acids) of the formula (VI):

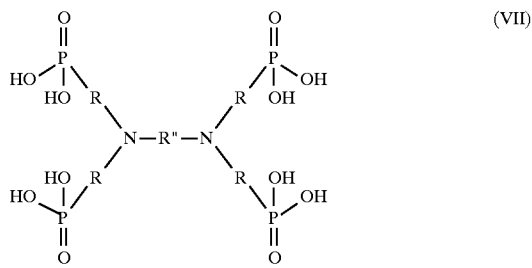

where R" is a divalent organic radical, such as an alkylene group having from 1 to 12 carbon atoms, and R is as defined above. One example is ethylene diamine tetra(methylene phosphonic acid). Examples of pentaphosphonic acids, $R(PO_3H_2)_5$ are the dialkylene triamine penta(methylene phosphonic acids) of the formula (VIII):

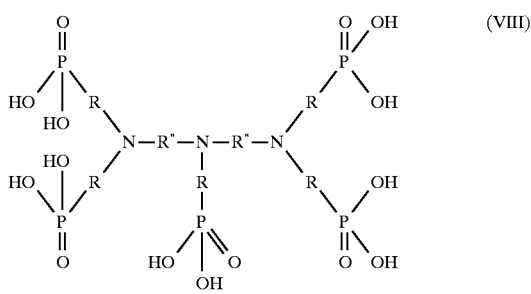

where R and R" are as defined above. For example, such pentaphosphonic acids include diethylene triamine penta (methylene phosphonic acid) of the formula:

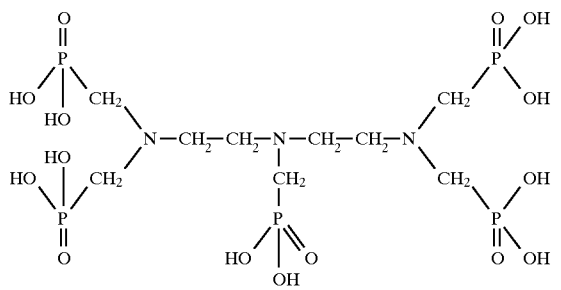

and bis hexamethylene triamine penta(methylene phosphonic acid) of the formula:

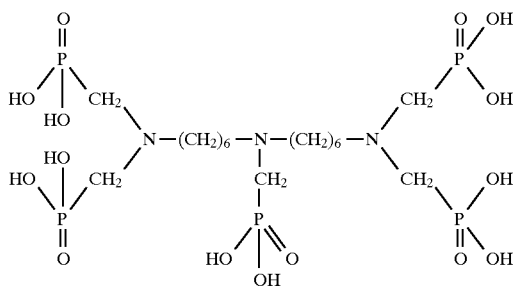

These nitrogen-containing acidic phosphorus latent curing agents also are commercially available from P. Chem as IS-32 and IS-22 respectively.

The nitrogen-containing acidic phosphorus latent curing agent used in accordance with the present invention may be used as the sole hardening agent, or more usually is used in combination with conventional acid hardeners, or acid catalysts. Acid catalysts for use in the phenolic resole resin composition of the present inventions are conventional strong acid catalysts known in the art. Such acids include inorganic acids such as hydrochloric, sulfuric, and phosphoric acid, and organic acids such as trichloracetic, sulfamic, aromatic di- and polysulfonic, e.g., phenyl sulfonic and other organo-sulfonic acids, conventional latent strong acid catalysts such as acid chlorides, and mixtures thereof. Preferred strong acid catalysts include a mixture of phosphoric acid and a strong organo-sulfonic acid such as the commercially available mixture of toluene and xylene sulfonic acids provided in ethylene glycol solvent or methane sulfonic acid.

The strong acid catalyst is present in the phenolic resole resin composition in sufficient amount to promote rapid curing of the resin at the desired elevated resin hardening temperature. Generally, the strong acid catalyst is provided in the composition in an amount between about 0.5 to 20 parts per hundred parts of the phenolic resole resin solids (pphr), and more preferably between about 1 to 10 pphr. Expressed alternatively, the strong acid catalyst may be provided in the phenolic resole resin composition in an amount from about 5% to about 80% by weight of the combination of the latent curing agent and strong acid catalyst, more usually in an amount from 25% to 60% by weight.

Generally, an aromatic sulfonic acid, such as p-toluene sulfonic acid (pTSA) is used as the acid catalyst. By varying the relative amount of latent curing agent and acid catalyst, one can control the activity of the hardener composition and ultimately the optimization of the physical properties of the hardened phenolic resole resin composition.

In the context of the present invention, low to ambient temperatures typically can be considered as less than 40° C., and preferably between about 0° C. and 35° C., and most usually between 0° C. and 25° C.

The present invention also is directed to a method of making a fast curing, long pot life phenolic resin composition. In accordance with the method, a phenolic resin is first prepared from formaldehyde and phenol. A resin predominantly having the preferred highly methylolated species is prepared using a two-step process. In the first step, phenol is reacted with formaldehyde in an aqueous reaction medium under alkaline reaction conditions using an alkaline catalyst at a high F:P mole ratio. (F:P of 1.5:1 to 4:1.) Then in a second step, additional phenol and alkaline catalyst are added. The additional amount of phenol being needed to obtain the desired final F:P mole ratio, is added and reacted to obtain the ultimate resin. Suitable F:P mole ratios for the ultimate resin were identified previously, preferably, the F:P mole ratio is 1.5 to 1.8. Temperatures and pH conditions for reacting the phenol and formaldehyde are well within the skill of the art. For example, in the first step of the process, the full complement of formaldehyde may be reacted with only half (50%) of the phenol, e.g., at an F:P mole ratio of about 3.4/1. Thereafter, the remaining portion of the phenol is added and the resin is reacted further to obtain an ultimate resin having an F:P mole ratio of about 1.7/1.

The amount of alkaline catalyst is preferably between about 0.6 to 1.4 part by weight per 100 parts by weight of total phenol added. The caustic solution is usually of approximately 50% strength. When a two stage addition of phenol is used, the catalyst is added in approximately the same proportion as the phenol. For example, if 50% of the phenol is initially added, then 50% of the total catalyst charge is initially added.

Thus, to only a portion of the phenol and alkaline catalyst, the full complement of formaldehyde is slowly added to drive the reaction to form the tetradimer. Adding the remaining phenol and alkaline catalyst consumes residual unreacted formaldehyde and causes a lowering of the resin's viscosity. The resulting resin can be characterized as a bimodal distribution of methylolated species with a large fraction of highly methylolated dimers and another significant fraction of predominately monomethylolated phenolic monomers. The bimodal distribution minimizes the level of 2,6 dimethylolphenol which is a highly reactive and undesirable species. The low level of this resin species results in the resin having better pot life and a lower tendency to show strong exotherms of the type which initiate at 55° C.

Alkaline reaction conditions can be established by use of any of the wide variety of alkaline catalysts, organic and inorganic, known to those skilled in the art. On the basis of cost and performance, an alkali metal hydroxide is preferred such as sodium, lithium or potassium hydroxide. Sodium hydroxide is particularly preferred. Other catalysts include alkali metal carbonates such as sodium carbonate and potassium carbonate, alkaline earth hydroxides such as magnesium hydroxide, calcium hydroxide and barium hydroxide, aqueous ammonia and amines. The alkaline catalyst promotes the reaction of the formaldehyde with phenol to form a phenol-formaldehyde resole resin.

The resin may then be neutralized as needed, for example, so as to obtain better storage stability. Conventional acidic neutralizing agents can be used including, but not limited to, methane sulfonic, hydrochloric, phosphoric, and sulfuric acids. A variety of acidic latent curing agents also can be used to neutralize the resin, including for example, the nitrogen-containing acidic phosphorus latent curing agents of this invention and the phosphate esters disclosed in U.S. Pat. No. 5,378,793. Generally, a sufficient amount of the neutralizing agent is added to establish a pH of between about 6.5 and 7.5 in the aqueous resin, although final pH levels as low as 4.0 often may also result in stable resin systems.

A nitrogen-containing acidic phosphorus latent curing agent then is added to the resin. The nitrogen-containing acidic phosphorus latent curing agent can be used as the sole curing agent; but preferably is used in combination with a conventional strong acid curing agent. In particular, it is preferred to use a relative amount of these two components so as to obtain a desired combination of extended pot life and rapid cure. For example, the latent curing agent typically will be added in a sufficient amount to retard curing of the resin in the presence of a strong acid catalyst at low to ambient temperatures. By varying the amount of the latent curing agent relative to the amount of the strong acid catalyst, and by varying the total catalyst content of the resin composition, a wide range of pot lifes and cure speeds can be obtained. In a preferred embodiment, a mixture of the latent curing agent and the strong acid catalyst is added to the resin immediately prior to resin use.

The present invention also is directed to a method of making a resin composite using the phenolic resin composition. Usually at low to ambient temperatures, a composite is formed by impregnating a substrate with the resin composition comprising a mixture of (a) a phenolic resole resin, (b) a nitrogen-containing acidic phosphorus latent curing agent, and (c) a strong acid curing catalyst, wherein the latent curing agent is present in a sufficient amount to retard the curing of the resin in the presence of the strong acid catalyst at low to ambient temperatures. Then, the temperature of the resin impregnated substrate is raised to an elevated temperature to cure the resin. Preferably the temperature is raised to a temperature above about 60° C., and usually between about 65° C. to 85° C. Composites can be cured overnight at temperatures as low as 25° C. to 80° C., while initial cure temperatures should not exceed 80° to 90° C. to avoid blistering. Postcuring the composites at 80° to 100° C. enhances ultimate composite mechanical strength.

The resin composition of the present invention is suitable for hand layup and continuous laminating processes, for producing prepregs, for resin transfer molding (RTM), for ram injection molding, for pultrusion applications, for filament winding and for making sheet molding compound. For fiberglass reinforcement, one can use chopped strand glass mats that are currently used in preparing polyester hand lay-up composite products and phenolic-compatable glass such as CertainTeed RO9 Type 625 or PPG Hybon®. The equipment used for the manufacture of such reinforced composites is well known to those knowledgeable in this technology and in many cases basically comprises an impregnation tank containing the phenolic resole resin composition of the invention. During operation, the reinforcing agent such as glass fibers, glass fiber roving or glass fabric is immersed in the tank to impregnate the reinforcing agent with the resin composition. In the case of glass fibers, after impregnation, the fibers may be wound on a mandrel (filament winding) or pulled through a die (pultrusion) to produce the desired composite shape.

EXAMPLES

The invention will be further described by reference to the following examples. These examples should not be construed in any way as limiting the invention.

Determination of the resin cure speed

Method for assessing cure speed in a catalyzed resole at elevated temperature: A 1 gram quantity of catalyzed resole is placed on a constant temperature hot plate with a surface temperature of 90° C. The resin is cast in the form of a pancake 1.5 to 2.5 mm thick. As cure proceeds, the resin sample becomes opaque and at gel, enters into a rubber-like state. As cure proceeds, the viscosity increases as the sample becomes increasingly harder. The cure speed is assessed by measuring the time until the resin forms a solid mass, indicated by a failure of the resin to form strings as it is deformed.

Pot life by viscosity

A catalyzed resin mixture (resin composition) is placed into a two ounce bottle. The viscosity of the sample is measured using a LVF Brookfield Viscometer and temperature is monitored using a thermocouple. The viscosity is measured as a function of time. The pot life is assessed as a function of the time for the sample to reach a viscosity of 3000 cp.

Example 1

The following standard phenolic resole resins: GP 5022 (Resin A), GP 441T62 (Resin B), GP 637D42 (Resin C) and GP 63D78 (Resin D) were formulated with a latent curing catalyst/strong catalyst mixture according to the present invention and tested for pot life and cure speed. The resin characteristics are reported in Table 1 below. These phenolic resole resins are all commercially available under the noted designations from Georgia-Pacific Resins, Inc.

TABLE 1

| | Typical Properties | | | |
|---|---|---|---|---|
| RESIN | VISCOSITY, cps | SOLIDS (%) | pH | % WATER |
| A | 600–1000 | 70–74 | 7.5–8.0 | 13 (max) |
| B | 400–800 | 72–76 | 6.8–7.2 | 13 (max) |
| C | 600–1000 | 72–76 | 7.5–8.0 | 11 (max) |
| D | 800–1200 | 72–76 | 7.5–8.0 | 11 (max) |

The resins were formulated with 6 parts catalyst solids per 100 parts resin solids (6 pphr). The catalyst comprised a mixture of 77 pbw of ATP solids and 23 pbw of toluene/xylene sulfonic acid (TX) solids. A TX catalyst mixture is commercially available from Witco as Witcat TX acid. The pot life and cure speed tests results of these resins are reported below in Table 2. For comparison, a control resin, constituting GP 5022 (Resin A) cured by 6 pphr of the strong acid catalyst solids (Witco Witcat TX acid) exhibited a pot life of 2 minutes and a cure speed of 15 seconds.

TABLE 2

TEST RESULTS

| RESIN | POT LIFE, min. | CURE SPEED, sec |
|---|---|---|
| A | 45 | 80 |
| B | 20 | 50 |
| C | 30 | 67 |
| D | 30 | 60 |
| Control | 2 | 15 |

Example 2

Resin A was formulated with various amounts of a latent curing catalyst/strong catalyst mixture according to the present invention and tested for pot life and cure speed. The catalyst mixture was prepared from about 60 pbw of ATMP solids and 40 pbw of a blend of TX acid (Witco Witcat TX acid) and ethylene glycol (EG) solids having a TX:EG weight ratio of 42:58). The results are reported in Table 3 below. As a control, Resin A was mixed with 5 phpr of the same TX and ethylene glycol (EG) mixture as the curing catalyst (as noted the TX and EG mixture had a TX:EG weight ratio of 42:58). The control results also are reported in Table 3.

TABLE 3

TEST RESULTS

| CATALYST, (pphr) | POT LIFE, min | CURE SPEED sec |
|---|---|---|
| 4 | 45 | 55 |
| 5 | 40 | 50 |
| 5.6 | 30 | 43 |
| 6.2 | 20 | 30 |
| Control | 12 | 30 |

Example 3

Six ply laminates were prepared from resin impregnated glass cloth and subjected to a variety of fire exposure test procedures. In particular, 7781 A-1100 soft finish glass cloth, available from Burlington Glass Fabric Industries, was impregnated with Resin A containing 5 phpr of a catalyst prepared by mixing about 60 pbw of ATMP solids and 40 pbw of the Witco Witcat TX acid/ethylene glycol blend referenced above in connection with Example 2. The resin-impregnated cloth was prepared at room temperature and then post-cured at 180° F. for 1 hour. The resin content of the cloth was about 38.5% by weight. The test results are reported in Table 4 below.

TABLE 4

U.S. Standard Fire Test Reults for Composites

| Test Method | Results |
|---|---|
| OSU Heat Release (kw-min-m$^{-2}$/kw-m$^{-2}$) ASTM E-1354 | 7/30 |
| NBS Smoke Density, ASTM F-814 | 3 |
| Smoke Density at 90 sec., ASTM E-662 | 1 |
| Smoke Density at 4 min., ASTM E-662 | 3 |
| Smoke Density, max., ASTM E-662 | 9 |
| Flame Spread Index, ASTM E-162 | 1 |
| Flex Strength, psi, ASTM D-790 | 42,200 |

It will be apparent to those skilled in the art that various modifications and variations can be made in the compositions and methods of the present invention without departing from the spirit or scope of the invention. Thus, it is intended that the present invention cover the modifications and variations of this invention provided they come within the scope of the appended claims and their equivalents.

What is claimed is:

1. A resin composition capable of being thermally cured consisting essentially of a mixture of (a) a phenolic resole resin, (b) a strong acid curing catalyst and (c) a nitrogen-containing acidic phosphorus latent curing agent containing one or more moieties of the following formula:

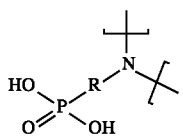

where R is selected from a $C_1$ to $C_6$ alkylene radical, a $C_3$ to $C_7$ cycloalkylene radical, an arylene radical and a divalent radical of the formula:

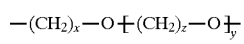

where x and z are integers of 1 to 6, and y is an integer from 0 to 2 and wherein the divalent radical is bonded to the phosphorous atom of said moieties through the terminal oxygen atom of said radical, and wherein the nitrogen-containing acidic phosphorus latent curing agent is present in a sufficient amount to retard the curing of the resin in the presence of the strong acid curing catalyst.

2. A method of making a resin composition consisting essentially of reacting phenol with formaldehyde to form a phenolic resole resin, neutralizing the resin, adding a nitrogen-containing acidic phosphorus latent curing agent containing one or more moieties of the following formula:

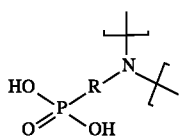

where R is selected from a $C_1$ to $C_6$ alkylene radical, a $C_3$ to $C_7$ cycloalkylene radical, an arylene radical and a divalent radical of the formula:

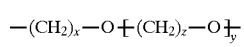

where x and z are integers of 1 to 6, and y is an integer from 0 to 2 and wherein the divalent radical is bonded to the phosphorous atom of said moieties through the terminal oxygen atom of said radical, and adding a strong acid catalyst wherein the nitrogen-containing acidic phosphorus latent curing agent is added in a sufficient amount relative to the strong acid catalyst to retard the curing of the resin in the presence of the strong acid curing catalyst.

3. A method of making a reinforced resin composite consisting essentially of (1) impregnating a substrate with a resin composition comprising a mixture of (a) a phenolic resole resin, (b) a strong acid curing catalyst, and (c) a nitrogen-containing acidic phosphorus latent curing agent containing one or more moieties of the following formula:

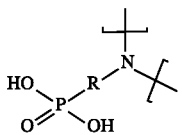

where R is selected from a $C_1$ to $C_6$ alkylene radical, a $C_3$ to $C_7$ cycloalkylene radical, an arylene radical and a divalent radical of the formula:

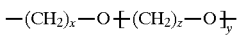

where x and z are integers of 1 to 6, and y is an integer from 0 to 2 and wherein the divalent radical is bonded to the phosphorous atom of said moieties through the terminal oxygen atom of said radical, wherein the nitrogen-containing acidic phosphorus latent curing agent is present in the resin composition in a sufficient amount relative to the strong acid catalyst to retard the curing of the resin in the presence of the strong acid catalyst and (2) curing the resin impregnated substrate.

4. A reinforced resin composite prepared by (1) impregnating a substrate with a resin composition consisting essentially of a mixture of (a) a phenolic resole resin, (b) a strong acid curing catalyst, and (c) a nitrogen-containing acidic phosphorus latent curing agent containing one or more moieties of the following formula:

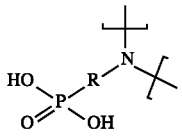

where R is selected from a $C_1$ to $C_6$ alkylene radical, a $C_3$ to $C_7$ cycloalkylene radical, an arylene radical and a divalent radical of the formula:

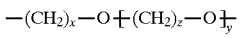

where x and z are integers of 1 to 6, and y is an integer from 0 to 2 and wherein the divalent radical is bonded to the phosphorous atom of said moieties through the terminal oxygen atom of said radical, wherein the nitrogen-containing acidic phosphorus latent curing agent is present in the resin composition in a sufficient amount relative to the strong acid catalyst to retard the curing of the resin in the presence of the strong acid catalyst and (2) curing the resin impregnated substrate.

5. A resin composition capable of being thermally cured consisting essentially of a mixture of (a) a neutralized phenolic resole resin, and (b) a nitrogen-containing acidic phosphorus latent curing agent containing one or more moieties of the following formula:

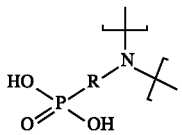

where R is selected from a $C_1$ to $C_6$ alkylene radical, a $C_3$ to $C_7$ cycloalkylene radical, an arylene radical and a divalent radical of the formula:

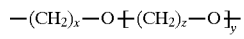

where x and z are integers of 1 to 6, and y is an integer from 0 to 2 and wherein the divalent radical is bonded to the phosphorous atom of said moieties through the terminal oxygen atom of said radical.

6. The invention of claim 5, 1, 2, 3, or 4 wherein the phenolic resole resin is prepared from a substituted or unsubstituted phenol.

7. The invention of claim 6 wherein the phenol is hydroxybenzene.

8. The invention of claim 7 wherein the phenolic resole resin is prepared from formaldehyde, alone or with one or more additional aldehydes.

9. The invention of claim 8 wherein the phenolic resin is prepared from formaldehyde alone.

10. The invention of claim 9 wherein a portion of the phenol is first reacted with formaldehyde at a formaldehyde to phenol mole ratio of between about 1.5:1 and 4:1, and then additional phenol is added and reacted to obtain the phenolic resole resin.

11. The invention of claim 5, 1, 2, 3, or 4 wherein the nitrogen-containing acidic phosphorus latent curing agent is a compound of the following formula:

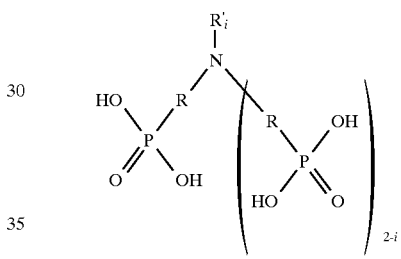

where R is selected from the group consisting of a $C_1$ to $C_6$ alkylene radical, a $C_3$ to $C_7$ cycloalkylene radical, an arylene radical and a divalent radical of the formula:

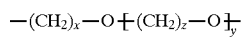

where x and z are integers of 1 to 6, and y is an integer from 0 to 2 and wherein the divalent radical is bonded to the phosphorous atoms of said compound through the terminal oxygen atom of said radical and where i is either 0 or 1, and R' is selected from hydrogen, a $C_1$ to $C_6$ alkoxy, a cycloalkyl, and an aryl.

12. The invention of claim 5, 1, 2, 3, or 4 wherein the nitrogen-containing acidic phosphorus latent curing agent is a compound of the following formula (II):

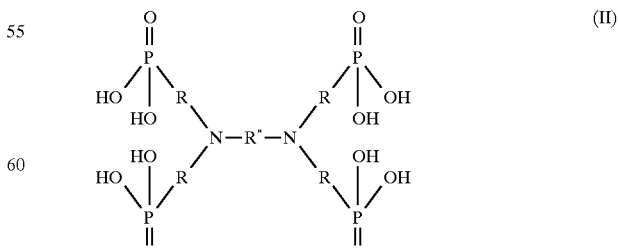

where R is selected from the group consisting of a $C_1$ to $C_6$ alkylene radical, a $C_3$ to $C_7$ cycloalkylene radical, an arylene radical and a divalent radical of the formula:

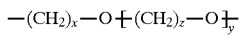

where x and z are integers of 1 to 6, and y is an integer from 0 to 2 and wherein the divalent radical is bonded to the phosphorous atoms of said compound through the terminal oxygen atom of said radical and where R" is a divalent organic radical.

13. The invention of claim 12 wherein the nitrogen-containing acidic phosphorus latent curing agent is ethylene diamine tetra(methylene phosphonic acid).

14. The invention of claim 5, 1, 2, 3, or 4 wherein the nitrogen-containing acidic phosphorus latent curing agent is a compound of the following formula (III):

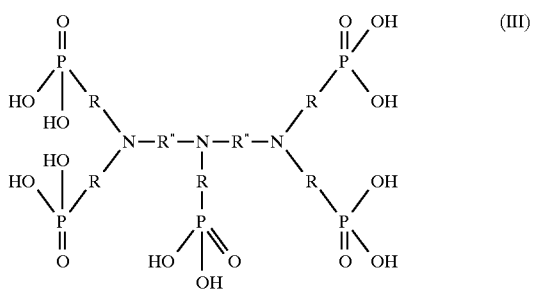

where R is selected from the group consisting of a $C_1$ to $C_6$ alkylene radical, a $C_3$ to $C_7$ cycloalkylene radical, an arylene radical and a divalent radical of the formula:

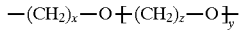

where x and z are integers of 1 to 6, and y is an integer from 0 to 2 and wherein the divalent radical is bonded to the phosphorous atoms of said compound through the terminal oxygen atom of said radical and where R" is a divalent organic radical.

15. The invention of claim 14 wherein the nitrogen-containing acidic phosphorus latent curing agent is selected from the group consisting of diethylene triamine penta (methylene phosphonic acid) and bis hexamethylene triamine penta(methylene phosphonic acid).

16. The invention of claim 5, 1, 2, 3, or 4 wherein the strong acid catalyst is selected from the group consisting of hydrochloric acid, sulfuric acid, phosphoric acid, trichloroacetic acid, an organo-sulfonic acid, and mixtures thereof.

17. The invention of claim 16 wherein the strong acid curing catalyst is a mixture of phosphoric acid and one or more organo-sulfonic acids.

18. The invention of claim 16 wherein the organo-sulfonic acid is a mixture of toluene sulfonic acid and xylene sulfonic acid.

19. The invention of claim 5, 1, 2, 3, or 4 wherein the phenolic resole resin is prepared using a ratio of formaldehyde to phenol of between about 0.9:1 to 3.5:1.

20. The invention of claim 19 wherein the phenolic resole resin is prepared using a ratio of formaldehyde to phenol of between about 1:1 to 1.8:1.

21. The invention of claim 3 wherein the substrate is selected from glass fibers, glass fiber roving and glass fabric.

* * * * *